No. 628,825. Patented July 11, 1899.
E. P. MASON.
SPINNING RING HOLDER.
(Application filed Feb. 20, 1899.)

(No Model.)

UNITED STATES PATENT OFFICE.

EARL P. MASON, OF NEWPORT, RHODE ISLAND, ASSIGNOR TO THE DRAPER COMPANY, OF PORTLAND, MAINE, AND HOPEDALE, MASSACHUSETTS.

SPINNING-RING HOLDER.

SPECIFICATION forming part of Letters Patent No. 628,825, dated July 11, 1899.

Application filed February 20, 1899. Serial No. 706,205. (No model.)

*To all whom it may concern:*

Be it known that I, EARL P. MASON, of Newport, county of Newport, State of Rhode Island, have invented an Improvement in Spinning-Ring Holders, of which the following description, in connection with the accompanying drawings, is a specification, like letters on the drawings representing like parts.

This invention has for its object the production of a novel and convenient holder for retaining spinning-rings in place on the ring-rail and to facilitate their application to and their removal from the same.

At present the ordinary form of ring-holder is held in place on the rail by two screws with overlapping heads, the bodies of the screws entering radial notches or slots in the base or body portion of the holder, and it is necessary to take out one of the screws in order to apply or remove the holder.

By virtue of the construction of my novel ring-holder it is only necessary to slightly loosen the screws, whereupon the holder may be swung aside to be completely disengaged from one screw and thereafter tipped slightly and withdrawn from the other one. This readiness of removal or application is a great convenience, as holders are changed frequently when spinning with different sizes of rings.

Figure 1:
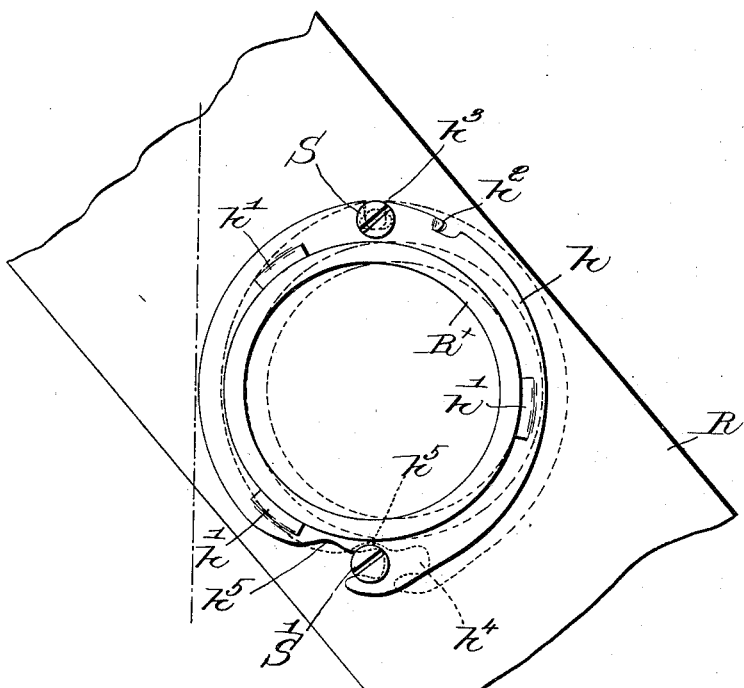
Figure 2:
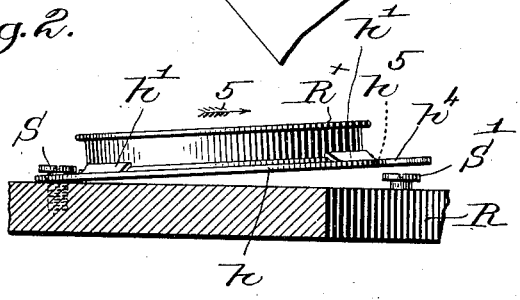

Figure 1 is a top or plan view of a ring-holder mounted on the ring-rail, partly shown, the ring being shown in place on the holder; and Fig. 2 is a side elevation of the holder disengaged from one retaining-screw and tipped in readiness to be withdrawn from the other.

Referring to Fig. 1, the usual ring-rail R is shown as provided with the usual retaining-screws S S' for the holder, said screws having overlapping heads to bear upon the base or body $h$ of the ring-holder.

I have herein shown the holder as made of sheet metal, the annular body $h$ having the usual upturned lugs or clips $h'$ struck up from its inner circumference to engage the foot of the ring $R^\times$ and provided with a traveler-clearer $h^2$.

Instead of providing the body with oppositely-located radial slots extended inward from its periphery I make the opening to one slot, as $h^3$, radial and to the other slot $h^4$ substantially tangential, the inner end of the slot $h^4$ being nearly diametrically opposite the slot $h^3$.

The periphery of the holder-body is concaved or recessed at $h^5$, Fig. 1, adjacent and outside of the mouth of the tangential slot $h^4$, for a purpose to be described.

Supposing the holder to be in place on the rail R, as in full lines, Fig. 1, with the screw-shanks in the bottoms of the slots $h^3$ $h^4$, if it is desired to remove the holder the screws are loosened and the holder is swung bodily to the right into dotted-line position, Fig. 1, on the screw S as a center until the recess $h^5$ is opposite the head of the screw S', the tangential position of the slot $h^4$ permitting such swinging movement of the holder. The holder is then lifted at one side, as shown in Fig. 2, to clear the head of screw S', the recess $h^5$ providing the necessary clearance and obviating undue swinging movement, and then the holder is withdrawn from beneath the head of screw S by movement in the direction of the arrow 5, Fig. 2. When the holder is to be replaced, the operation is reversed, the part of the holder having the radial notch $h^3$ being slid under the head of screw S, so that the shank of the latter enters the slot and the holder is dropped onto the rail past the head of screw S' by means of the clearance-recess $h^5$.

Swinging movement of the holder to the left, Fig. 1, from dotted to full line position locks the screw S' in the tangential slot $h^4$ and the two screws are tightened.

My invention is not restricted to the precise construction and arrangement shown and described, for, so far as I am aware, it is broadly new to provide a ring-holder which may be removed from the ring-rail or applied thereto without removing one or both retaining-screws.

Having fully described my invention, what I claim as new, and desire to secure by Letters Patent, is—

1. As a new article of manufacture, a spinning-ring holder having a tangential locking-slot, to receive the shank of the holding means.

2. As a new article of manufacture, a spinning-ring holder having two open screw-receiving slots, one of said slots being substantially tangential to the inner circumference of the holder, to receive the shank of the holding means.

3. As a new article of manufacture, an annular, sheet-metal holder for spinning-rings, provided with upturned ring-engaging lugs and having a tangential locking-slot in its body portion, to receive the shank of the holding means.

4. As a new article of manufacture, a spinning-ring holder having its body provided with a substantially tangential, open-ended locking-slot, the periphery of the body having a recess therein adjacent and outside the open end of the slot.

5. As a new article of manufacture, a sheet-metal holder for spinning-rings, having a radial slot in its body portion with outwardly-divergent sides, and a coöperating tangential locking-slot, to receive the shank of the holding means.

6. As a new article of manufacture, a sheet-metal holder for spinning-rings having a flat, annular body provided with upturned holding-ears and slotted inward from its periphery to receive the bodies of retaining-screws, one of said slots being radial and the other tangential to the periphery of the body, to receive the shank of the holding means.

In testimony whereof I have signed my name to this specification in the presence of two subscribing witnesses.

EARL P. MASON.

Witnesses:
GEO. OTIS DRAPER,
ALBERT H. COUSINS.